United States Patent Office 3,424,486
Patented Jan. 28, 1969

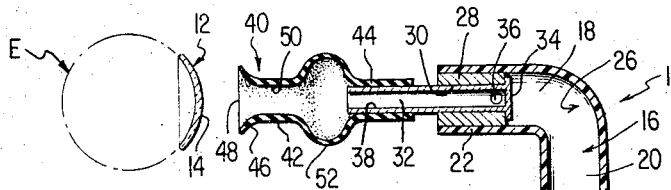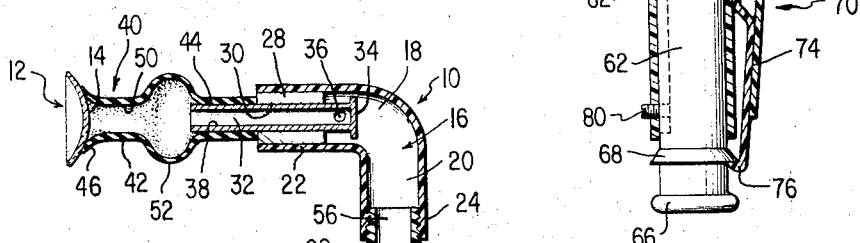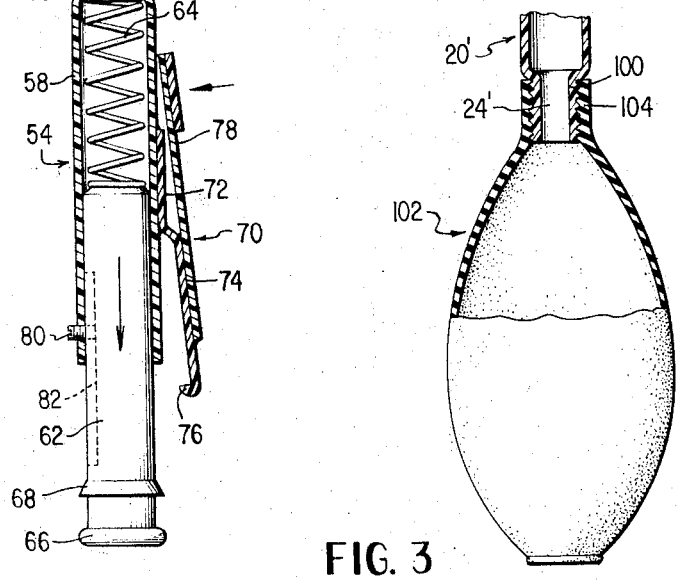

3,424,486
CONTACT LENS HANDLING APPARATUS
Clifton Corley, 232 Brazilian Ave.,
Palm Beach, Fla. 33480
Filed Nov. 29, 1966, Ser. No. 597,627
U.S. Cl. 294—64     7 Claims
Int. Cl. A61f 9/00

ABSTRACT OF THE DISCLOSURE

A device for handling contact lenses, particularly for extracting such lens, including a suction cup at one end and a handle incorporating vacuum creating means at the other end. The handle is disposed laterally of the lens engaging suction cup out of the path of vision and enabling the operator to view the operation in a mirror.

*Background of the invention*

The contact lens extraction apparatus presently in use comprises a flexible synthetic plastic or rubber tube about one quarter of an inch in diameter and about one and one half inches long, the tube being closed at one end and having an annular suction cup at the other end in communication with the suction chamber defined by the interior of the tube. In use, the operator must align the tube with the eye to engage the cup with the lens which is positioned against the eyeball, while squeezing the tube to expel air therefrom. When the cup is engaged with the lens, the tube is relaxed to create a suction for holding the lens against the cup as it is removed.

The use of the foregoing apparatus is difficult because both the tube and the operator's hand are in the direct line of vision and blocks the view from a mirror. Moreover, unless the operator is quite adept and has good muscular control, the movement of the device toward the eyeball may be jerky in which event undue pressure may be applied against the lens, resulting in hurt or damage to the eye and even in damage to the lens. As a result, many contact lens wearers must rely upon other persons to operate these lens extracting devices.

It is a basic objective of the present invention to provide an apparatus particularly adapted for use in the removal of contact lenses and the like, the apparatus being so constructed as to avoid or minimize obscuring of vision and to be most conveniently suited to the particular positioning required in the accurate placement and removal of the lenses.

Another objective of the invention is to provide a unit as aforesaid which is constructed of noncomplex components and which is particularly designed to avoid hurt or damage to the eye or to the lens during the placement and removal process.

A still further objective of the invention resides in the provision of an extractor that is capable of use without difficulty by the wearer of a contact lens so that reliance upon others is not necessary.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawing, wherein like reference characters indicate like parts throughout the several figures and in which:

FIG. 1 is a vertical cross-sectional view showing a first form of extraction apparatus constructed in accordance with the present invention in a first operating position;

FIG. 2 is a view similar to FIG. 1, showing the compoents in a second position of operation; and FIG. 3 is a fragmentary detail view, partially in cross section, showing a modification in the air evacuation means hereof.

Referring to the drawing in more detail, and initially to the form of the invention shown in FIGS. 1 and 2, the extraction apparatus 10 is here disclosed as employed in the environment of a means for the lifting of a contact lens 12 from its position on the eye E of the wearer. The lens 12 normally includes a convex outer surface 14 and is formed of a suitably smooth optical material. While the device 10 may be employed for the insertion of a contact lens, it primarily is intended for, and its greatest utility is in, the extraction or removal of such a lens.

In a preferred embodiment of the extraction apparatus 10, the device includes a main body section 16 formed of a rigid plastic and including right angular sections 18 and 20. The sections are each of tubular form and section 18 has a proximal end portion 22 while section 20 has a distal end 24, and the interiors of the sections collectively define a suction chamber 26. The angular formation of the main body section is of importance to the invention in that it permits the accurate location of the lens supporting assembly with the operating section disposed at an offset location therefrom and out of the line of vision during use.

A substantially cylindrical plug 28, with a central opening 30 therein, is frictionally or otherwise engaged in the end portion 22 of the body section and elongated plunger 32 is slidably mounted in the opening 30 of the plug and preferably has an inner end wall 34 of enlarged diameter restricting its outward movement. Vent means 36 is formed in the side wall of the plunger to extend from its axial bore 38 and to permit air passage therethrough in one position of the plunger as explained more fully below.

Gripping means 40 for the extractor 10 comprises a small diameter sleeve 42 of rubber or similar flexible material having a connection section 44 frictionally engaged about the exposed outer end portion of the plunger 32. The means 40 further includes an annular cup 46 with an exposed face 48 shaped for conformable peripheral contact with the lens surface 14. The sleeve 42 defines a bore 50 opening to the plunger bore 38 for the passage of air therethrough in creating a suction force or pressure differential. An enlarged bulb section 52, which may be thin walled or otherwise weakened, is provided intermediate the cup 46 and connection section 44 and serves to limit the pressure applied by the cup to the lens 14 to thereby avoid damage to the lens or hurt to the eye E and to provide a means for the application of reverse pressurization for expediting its release from the cup following removal.

The means for evacuation of air from the main body section 16 and the gripping means 40 comprises, in the first form of the invention, a cylindrical housing 54 having a reduced, upper end 56 separated from its main extent 58 by a shoulder 60. A piston member 62 is slidably mounted in close contact with the housing and a spring 64 is interposed between the shoulder 60 and the piston 62. At its outer end, the piston is provided with an enlarged handle 66 and a connection stop flange 68. The reduced upper end 56 is secured to the distal end 24 of the body 16 in any suitable manner as by a press fit or by threads as shown.

An operating release lever assembly 70 includes a connection arm 72 fixed to the housing and having an outwardly stepped hinge portion 74 terminating in a lip or hook 76 engageable with the stop flange 68. A handle 78 is fixed to the portion 74 for the application of leverage to swing the hook 76 from the flange 68 to permit movement of the piston 62 by the spring 64 to create a suction in chamber 16. Suitable stop means may be provided between the cylinder 54 and piston 62, such as a removable pin 80 in the cylinder and longitudinal slot 82 in the piston, to prevent accidental removal of the piston from the cylinder.

In operation, with the components in the respective positions shown in FIG. 1, that is, with the piston 62 inserted in the cylinder 54 and secured by the latch 76, and the plunger 32 fully withdrawn so that the vent means 36 is closed, the cup 46 is positioned against the lens surface 14 with the cup face 48 bearing snugly and conformably thereagainst. The operator's view is not obscured because of the right angular configuration of the body 16, his hand engages the device by the cylinder 54 which serves as a handle and is out of the line of vision. Moreover, undue pressure against the lens is precluded by the bulb portion 52 and the inward sliding of the plunger 32.

When the cup is engaged with the lens, the wearer then applies inward force to the lever 78 causing disengagement of the latch 76 from the flange 68, whereupon the expansion of the spring 64 forces the piston 62 outwardly, creating a condition of less than ambient atmospheric pressure within the suction chamber 26. If the plunger has not previously been moved inwardly, the suction draws it in to uncover the vent means 36 and create suction through the cup 46 to adhere to the lens 12 and provides for the convenient extraction of the lens from its place on the eyeball E. The lens is conveniently held against the cup face in the manner shown in FIG. 2 until either the cylinder 62 is pressed inwardly or the bulb 52 compressed. It will be observed that the operating portions of the invention are all offset from the cup bearing portion, thereby permitting precise positioning of the assembly.

In FIG. 3, a modification of the means for air evacuation is shown. Here, the distal end 24' of the body section 20' is reduced and externally threaded as at 100 and a hollow, imperforate bulb 102 of rubber or the like is attached thereto at its threaded neck 104. Operation is similar to that described above with respect to the first form of the invention. Initial positioning of the components would involve a manual collapse of the bulb 102 with its release from that position corresponding to the release of the cylinder member in the first form of the invention.

The embodiment shown comprises the most sophisticated assembly according to the invention. Obviously, the main body portion 16 and the cylinder 54 can be integrally molded and the cup 46 applied directly to the proximal end 22, and this would accomplish the primary objective of clearing the line of vision. Even with such simplified structure, however, it is preferred that the bulb 52, and also the plunger 32, be interposed between the cup 46 and the body 16 to preclude pressure on the lens or the eyeball.

Having described and illustrated two forms of the invention in some detail, it will be understood that these descriptions and illustrations have been offered only by way of example.

What is claimed is:

1. In an extraction apparatus for gripping and removal of a contact lens from an operator's eye, a tubular body having a proximal end section and a distal end section, said distal end section including suction means and constituting a handle for manipulating the apparatus, an annular suction cup at said proximal end of said body and in communication with said suction means, said cup being adapted for contact with a contact lens, and means for evacuating air from said body to create a suction force through said cup, the improvement in which said tubular body is of L-shaped formation with said proximal end section being of smaller diameter than said handle forming distal end section and said handle forming distal end section and air evacuating means disposed laterally of said proximal end and cup to be out of the line of vision as said cup approaches an operator's eye.

2. The invention of claim 1, wherein said body includes an enlarged, pressure limiting bulb portion adjacent said cup.

3. The invention of claim 1 wherein said body includes a tubular plunger mounted for reciprocal movement in said body proximal end section and carrying said cup, said plunger serving to limit pressure by said cup on a lens against the operator's eye, said plunger being closed at its inner end and having a laterally disposed air passage adjacent said inner end and which opens to the suction means upon inward plunger movement.

4. The invention of claim 3, wherein said tubular plunger includes an enlarged, pressure limiting bulb portion adjacent said cup.

5. The invention of claim 3, wherein said air evacuation means comprises an elongated sleeve attached to said distal end section, a cylinder slidably disposed within the sleeve, spring means urging the cylinder outwardly, and releasable latch means for holding the cylinder against movement when said spring is compressed.

6. The invention of claim 5, wherein said cylinder has a flange rim adjacent the outer end thereof; and said latch means comprises a hook engageable with the flange ring.

7. The invention of claim 3 comprising a sleeve fixed in said proximal end section and slidably supporting said plunger, said plunger having enlargements at its inner end and adjacent said cup and captively mounting said plunger within said sleeve.

References Cited

UNITED STATES PATENTS

| | | |
|---|---|---|
| 3,129,971 | 4/1964 | Kobler. |
| 3,304,113 | 2/1967 | Hutchison _____ 294—64 |
| 3,330,589 | 7/1967 | Mumma _____ 294—64 |

RICHARD E. AEGERTER, *Primary Examiner.*

ROBERT D. GUIOD, *Assistant Examiner.*